SELF-STARTING TRANSISTOR CONVERTER WITH OVERLOAD PROTECTION

Filed April 16, 1959 2 Sheets-Sheet 1

INVENTORS
HETTE SMEDEMA
JOHANNES NOORDANIS
JOHAN GEERT DAMSTRA
BY
Frank R. Trifari
AGENT INVENTORS
HETTE SMEDEMA
JOHANNES NOORDANIS
JOHAN GEERT DAMSTRA
BY
Frank R. Jifani
AGENT

United States Patent Office 3,098,201

Patented July 16, 1963

3,098,201

SELF-STARTING TRANSISTOR CONVERTER WITH OVERLOAD PROTECTION

Hette Smedema, Johannes Noordanis, and Johan Geert Damstra, all of Hilversum, Netherlands, assignors to North American Philips Company, Inc., New York, N.Y., a corporation of Delaware Filed Apr. 16, 1959, Ser. No. 806,877
Claims priority, application Germany Apr. 18, 1958
9 Claims. (Cl. 331—113)

This invention relates to a voltage converter comprising a pair of input terminals for connection to a direct-voltage source, at least one transistor oscillator which is self-excited by feedback through a transformer, and a pair of output terminals at which an output voltage is produced.

In such known converters it is usually of advantage or even necessary to promote building up of the oscillations by means of a forward voltage applied to the base of the transistor from the direct-voltage source. Otherwise the transistor oscillator frequently does not start oscillating at all or, if it is caused to oscillate in the unloaded condition owing to a transient current pulse, it is prevented from thereafter building up its oscillations by the load connected to its output terminals. This applies to direct-voltage converters the load circuits of which contain a rectifier. In this case, the load impedance is very small and consequently the initial effective load is very heavy. This is especially true if the smoothing filter following the rectifier contains a shunt capacitor connected directly to the rectifier or is even constituted only by such a capacitor, for reasons of economy.

It has been proposed to apply a temporary forward bias voltage to the base electrode of the transistor oscillator by means of a capacitor. However, this solution of the problem is not satisfactory when the filter mentioned above contains a comparatively large capacitor directly connected to the output of the rectifier, because the forward bias should be maintained until said filter capacitor has been practically completely charged; this leads to capacitors of objectionably large capacitance and size for applying the temporary forward bias.

The known converters using forward adjustment of the transistor bases also have a limitation in that this adjustment is maintained even when the converter is overloaded, so that the power losses produced in the transistor itself sharply increase and may even cause destruction of the transistor. In this respect, a slight forward adjustment by means of a resistive voltage divider is to be preferred to the comparatively large forward adjustment obtained by inserting between the base and the emitter, a diode connected in the forward direction. Even when using the said resistive divider, however, there may occur thermal instability and consequent final destruction of the transistor.

It is an object of the present invention to obviate the described disadvantages of the known transistor converter arrangements provided with forward base adjustment.

The voltage converter in accordance with the invention is characterized in that the circuit via which the forward voltage is applied to the base of the oscillator transistor includes the collector-emitter path of an auxiliary transistor, to the base of which a control voltage is applied which depends upon the load of the converter; in this manner the forward voltage is reduced when the converter is overloaded.

Preferably the control voltage for the base of the auxiliary transistor is taken from the feedback winding of the transformer, a forward voltage being momentarily applied to this base when the converter is switched into circuit, so that at the beginning of the building-up time of the oscillator the auxiliary transistor is conducting and transmits the forward voltage for the base of the oscillator transistor. A particularly advantageous embodiment contains at least one pair of push-pull connected oscillator transistors and a pair of auxiliary transistors the base-emitter paths of which are each controlled in push-pull by the voltage of the entire feedback winding.

In order that the invention may readily be carried out, it will now be described more fully with reference to the accompanying diagrammatic drawings, in which.

Figure 1:
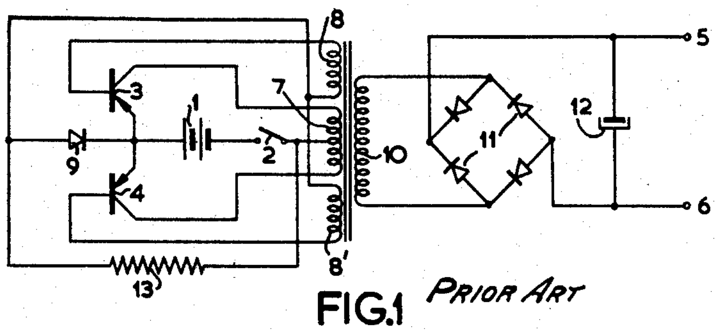
FIG.1 PRIOR ART
FIG. 1 is a circuit diagram of a known voltage converter.

The known voltage converter shown in FIG. 1 comprises a pair of input terminals for connection to a direct-voltage source 1, for example a dry battery or an accumulator having a voltage of 12 volts, a transistor oscillator which is coupled through a feedback transformer 7, 8, 10 and comprises push-pull connected transistors 3 and 4 of the pnp-conductivity type, and a pair of output terminals 5 and 6 at which a stepped-up direct voltage is produced. The collector electrodes of the transistors 3 and 4 are connected to the negative terminal of the voltage source 1 via the two halves of the center-tapped primary winding 7 of the transformer and a make-and-break switch 2. The emitter electrodes are directly connected to the positive terminal of this voltage source and the bases are also connected to the positive terminal of the voltage source 1 through halves 8 and 8' respectively of a feedback winding and a diode 9 connected in the forward direction. The transformer further has a secondary winding 10 to which a bridge-rectifier arrangement 11 is connected. The output terminals 5 and 6 are bridged by a smoothing capacitor 12 and connected to the output terminals of the rectifier 11. Finally the circuit arrangement comprises a resistor 13 through which the junction of the feedback winding 8, 8' and the diode 9 is connected to the negative terminal of the voltage source 1, via the switch 2.

The resistor 13 of, for example, 100 ohms acts to apply a small bias voltage in the forward direction to the bases of the transistors 3 and 4. Owing to this bias, these transistors are conductive at the moment of switching on, so that the transistor oscillator is automatically able to build up its oscillation in the loaded condition. It should furthermore be noted that the smoothing capacitor 12 is directly connected to the output of the rectifier 11. This capacitor is generally an electrolytic capacitor of comparatively large capacitance value which alone provides the smoothing of the produced increased direct voltage. At the moment when the switch 2 is switched on, the capacitor 12 is naturally not charged, so that it provides a heavy load for the circuit arrangement. Consequently the circuit arrangement would not automatically start oscillating in the absence of the resistor 13. In operation, a certain current flows through the switch 2, the resistor 13 and the diode 9. The diode is conductive so that power is wasted in the resistor 13. A great disadvantage of this circuit arrangement is that it cannot withstand material overloading. If the circuit arrangement stops oscillating owing to overloading or short-circuiting of the output, the transistors 3 and 4 are maintained conductive by the forward bias voltage. The power output is then materially reduced; since the alternating voltages across the various windings of the transformer are also considerably reduced, the collector voltages become increasingly higher: the transistors operate above the bends of their collector-current/collector-voltage characteristic curves.

Hence the power wasted in the circuit arrangement is materially increased. This power is mainly dissipated in the transistors which become so hot that they are destroyed after some time (thermal instability). This can to some extent be prevented by substituting a small resistor for the diode 9. This ensures that, if the output is short-circuited, the absorbed power is also reduced. However, owing to the forward voltage required for satisfactory building up, this absorbed power remains so large that in the case of a short-circuit and at an elevated temperature of, say, 70° C., the circuit arrangement is again thermally unstable, which may give rise to destruction of the transistors. Hence it is desirable to eliminate the forward bias in the event of overloading of the circuit arrangement.

Figure 2:
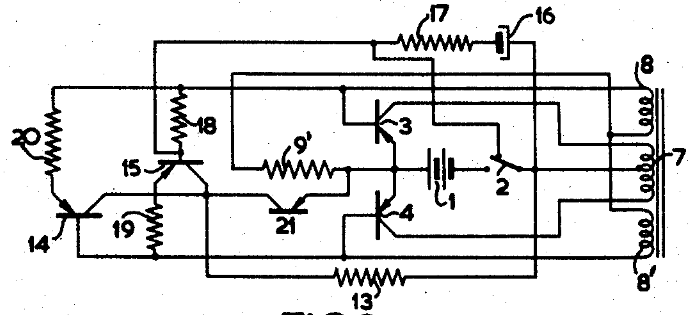
FIG. 2 is a circuit diagram of a first embodiment.

For this purpose the first embodiment shown in FIG. 2 is provided with auxiliary transistors 14 and 15 through the collector-emitter paths of which the forward bias is supplied to the bases of the oscillator transistors 3 and 4. A control voltage dependent on the converter load is applied to the bases of the auxiliary transistors 14 and 15 from the feedback winding 8, 8′. The voltage across this feedback winding decreases with increase of the loading of the circuit arrangement, so that the forward bias of the bases of the transistors 3 and 4 is reduced on overloading of the converter.

When the converter is switched on by means of the switch 2, a forward voltage is momentarily applied to the base of the auxiliary transistor 15. For this purpose the circuit arrangement includes an electrolytic capacitor 16 the negative electrode of which is connected to the movable contact of the switch 2, while its positive electrode is connected to the fixed contact of this switch via a resistor 17. The junction point of the resistor 17 and of the lead connecting it to the fixed contact of the switch is connected to the base of the auxiliary transistor 15 which, via a resistor 18, is connected to the junction point of the base of the transistor 3 and of the feedback winding 8. When the switch 2 is closed, the base of the auxiliary transistor 15 is momentarily raised to the potential of the negative terminal of the voltage source 1, via the resistor 17 and the capacitor 16, so that the transistor 15 becomes highly conductive; when this occurs, a forward voltage is applied to the base of the transistor 4 via the resistor 13 connected in the collector circuit of transistor 15 and a small emitter resistor 19.

When the oscillator comprising the transistors 3 and 4 is building upon oscillations, the capacitor 16 is gradually charged to the voltage of the source 1 via the resistors 17, 18 and 9′, so that the forward bias at the base of the transistor 15 disappears after some time. However, the auxiliary transistors 14 and 15 are then driven by the voltage across the entire feedback winding 8, 8′ applied between their bases and emitters, so that the auxiliary transistor 14, through which the forward base voltage is applied to the transistor 3, is driven in the forward direction simultaneously with the transistor 4; the transistor 15, through which the forward base voltage is supplied to the transistor 4, is driven in the forward direction simultaneously with the transistor 3. Thus, the transistors 14 and 15 alternately bring the respective ends of the winding 8 and 8′ coupled to their emitters to the common direct voltage potential of their collector electrodes. The auxiliary transistors 14 and 15 and the main transistors 3 and 4 are driven so that, during each half cycle of the produced oscillation, they are either completely conductive or completely cut off, the forward bias voltage for the base of each main transistor being substantially determined by the voltage divider comprising the common collector resistor 13 and the emitter resistors 19 and 20 respectively of the auxiliary transistors and the resistor 9′. Owing to the provision of the base resistor 18 in the base circuit of the auxiliary transistor 15, this transistor amplifies the main part of the charging current of the capacitor 16 which flows, on the one hand via the resistor 17, the base-emitter path of this auxiliary transistor and the resistor 19 and, on the other hand, via the resistor 18. Hence building-up takes place more readily the higher the value of the resistor 18. However, if this resistor is too large, the collector-emitter leakage current of the transistor 15 becomes increasingly important and, since this current (at most equal to $I'_{co}$) is highly temperature-dependent, the forward adjustment of the main transistors also varies with the temperature. This may go so far that the resistor 13 of, for example, 100 ohms is connected virtually directly to the base connections of the main transistors, via the emitter resistors 20 and 19 and through the collector-emitter paths of the auxiliary transistors. In order to prevent this direct connection, a temperature compensation is provided for in the circuit arrangement according to FIG. 2. This is obtained by means of a fifth transistor 21, the collector of which is connected to the junction point of the collectors of the auxiliary transistors 14 and 15 and of the resistor 13, while its emitter is connected to the positive terminal of the voltage source 1. The base of the transistor 21 is left open, so that the current through the emitter-collector path thereof is only a temperature-dependent leakage current. This leakage current $I'_{co}$ is always much larger than the leakage current of the transistors 14 or 15, the base circuits of which do not contain an infinitely large impedance. The leakage current increases with the temperature and causes a rapid decrease of the potential at the collectors of the transistors 14 and 15, so that the leakage currents through these transistors remain very small and the forward current supplied to the common base circuit of the transistors 3 and 4 via the collector-emitter paths of the transistors 14 and 15 is at least approximately temperature-independent. The resistor 18 may thus have a comparatively high value, for example 470 ohms, so that even if the circuit arrangement is loaded by a large electrolytic capacitor, for example the capacitor 12 of FIG. 1, building-up takes place without difficulty even at a low ambient temperature. At an elecated ambient temperature, the leakage current through the compensating transistor 21 becomes increasingly greater; however it does not impair the starting of the oscillator circuit at all, since with increase in the temperature this starting occurs automatically and with increasing facility without the use of a forward bias voltage.

If the voltage converter is overloaded, for example, when the output terminals 5 and 6 (FIG. 1) are short-circuited, the feedback voltage across the winding 8, 8′ decreases approximately in the same proportion as the voltage across the secondary winding 10, so that the driving of the auxiliary transistors 14 and 15 is also reduced by the overload condition. The transistors 14 and 15 are excessively strongly driven, so that the direct-current bias does not disappear immediately on overloading, but only after a certain threshold value of the overload has been reached. Consequently, the converter can be slightly overloaded and this is frequently highly desirable in practice. When the said threshold value is exceeded, the circuit arrangement automatically stops oscillating and must be started anew. As will be described more fully hereinafter, the overload threshold is adjustable. Below this threshold the oscillation voltage decreases with increasing load, since the maximum current which the main transistors can deliver and which is determined by the fixed control voltage is reached. Under these conditions the power dissipated in the transistors 3 and 4 in the event of a short-circuit is limited to the product of the respective leakage currents of these transistors in the cut-off condition. Hence the transistors 3 and 4 are effectively protected against any overloading.

Figure 4:
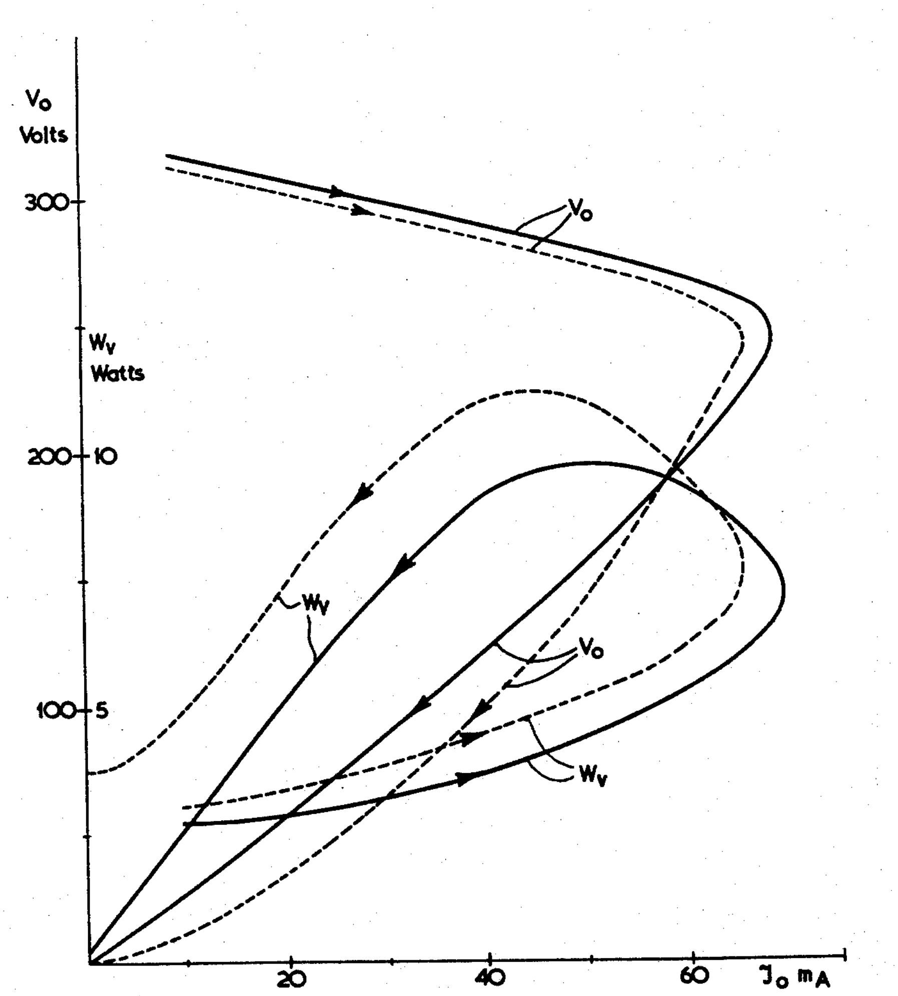
FIG. 4 is a current-voltage diagram and a current-power diagram of a practical embodiment of the circuit arrangement shown in FIG. 2.

The diagrams shown in FIG. 4 illustrate the operation of a voltage converter of the kind shown in FIG. 2 in which the transistors 3 and 4 were of the type OC16 and the remaining transistors of the type OC72. The battery 1 had a nominal voltage of 12 volts, the resistor 9′ a value of 10 ohms and the capacitor 12 (FIG. 1) a capacitance of 50 $\mu$f. The values of the resistors 13, 17, 18, 19 and 20 were 100, 470, 470, 27 and 27 ohms, respectively, and the capacitance of the charging capacitor 16 was 250 $\mu$f. The solid curves representing the output voltage $V_0$ and the power $W_v$ dissipated in the circuit arrangement as functions of the load current $I_0$ were taken at an ambient temperature of 21° C. and the broken curves at an ambient temperature of 71° C. From these curves it will be apparent that the output voltage drops abruptly at a certain load and approaches the limiting value zero along a second branch of the curve, so that the power dissipated in the circuit arrangement cannot exceed a value of about 11 watts (at 71° C.) and remains very small when the oscillation stops (smaller than 4 watts at 71° C.).

Figure 3:
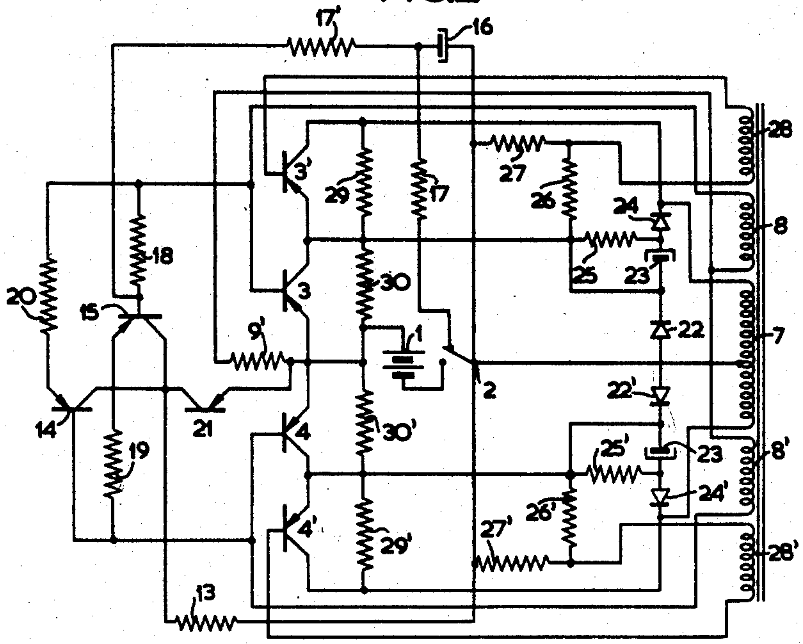
FIG. 3 is a circuit diagram of a second embodiment.

FIG. 3 shows a second embodiment in which use is made of four main transistors 3, 3', 4 and 4', two auxiliary transistors 14 and 15 and one compensating transistor 21. This voltage converter is rated for a supply voltage of 24 volts. In order to prevent the main transistors from being damaged by voltage peaks which may occur across the primary winding 7 of the transformer, the emitter-collector paths of each pair of main transistors 3, 3' and 4, 4' are connected in series, the bases of the main transistors 3' and 4' being energized by additional feedback windings 28 and 28', respectively. For the arrangement to start oscillating, it is sufficient to apply a forward bias to the base circuits of the main transistors 3 and 4 by means of a circuit arrangement which exactly corresponds to that of the embodiment shown in FIG. 2, with the exception that the resistor 17 of FIG. 2 is replaced by a first resistor 17, across which the capacitor 16 can discharge in the switched-off condition of the converter, and by a second resistor 17', via which, at the instant of switching-on, the potential at the movable contact of the switch 2 is applied to the base of the auxiliary transistor 15 via the capacitor 16.

Across each half of the primary winding 7 there is connected a series circuit comprising a rectifier 22 and 22', an electrolytic capacitor 23 and 23' and a second rectifier 24 and 24', respectively. The capacitor 23 or 23' is bridged by a resistor 25 or 25' respectively and the junction point of the emitter of the transistor 3' and of the collector of the transistor 3 is directly connected to the junction point of the rectifier 22 and of the capacitor 23, while the corresponding junction points of the elements 4, 4', 22' and 23' are likewise directly connected to one another. On the other hand, the terminal of the feedback winding 28 connected to the base of the transistor 3' is connected to a tapping point of a voltage divider connected between the junction point of the emitter of the transistor 3' and of the collector of the transistor 3 and the movable contact of the switch 2. This voltage divider comprises resistors 26 and 27, a corresponding voltage divider comprising resistors 26' and 27' being provided for the transistors 4 and 4'. Finally, voltage dividers comprising resistors 29, 30 and 29', 30', respectively are connected between the positive terminal of the voltage source 1 and the collector of the transistors 3' and 4', respectively, the tapping points on these voltage dividers being again connected to the junction points of the collectors of the transistors 3 and 4 and of the emitters of the transistors 3' and 4', respectively.

By cooperation of the voltage dividers 29, 30 and 29', 30' with the series circuits 22, 23, 24 and 22', 23', 24' and the resistors 25 and 25', respectively, a satisfactory division of the voltages over the emitter-collector circuits of the transistors 3, 3' and 4, 4' is achieved both with respect to alternating voltages and to direct voltages. On the other hand, a forward voltage is always applied to the bases of the transistors 3' and 4' from the negative terminal of the voltage source 1, via the switch 2 and the resistor 27 and 27', respectively, which acts as a voltage divider together with the resistor 26 or 26', respectively. If the converter is overloaded, the auxiliary transistors 14 and 15 are cut off, so that the loss current flowing through the series-connected emitter connector circuits of the transistors 3, 3' and 4, 4', respectively, is restricted to the small leakage currents of the transistors 3 and 4, respectively. This process does not require the suppression of the forward bias of the bases of the transistors 3' and 4' also.

The compensation transistor 21 may obviously be replaced by a resistor having a negative temperature coefficient. It is of importance that the compensation resistor or transistor be brought to the temperature of the main transistors 3 and 4 or 3, 3' and 4, 4', respectively, which is best achieved by mounting this element on the same cooling plate as the main transistors. This temperature compensation is not indispensable, but very advantageous. It should be mentioned that the resistor 9' can be bridged by a forward-connected diode such, for example, as the diode 9 of FIG. 1. The losses are thus slightly reduced and the output power is slightly increased.

With respect to the $W_v$-curves of FIG. 4, it should be noted that about one eighth of the maximum power loss is dissipated in each of the resistor 13, the transformer and the rectifier 11 (FIG. 1), so that the maximum power dissipated in the transistors 3 and 4 is limited to about 4 watts in each transistor. At the temperature of 71° C. the oscillations do not die out entirely in the case of overloading, but the oscillator continues oscillating with a very small amplitude, and this explains the material difference in variation at overloading between the two $W_v$-curves. However, the circuit arrangement remains thermally stable and the transistors 3 and 4 are in no case overloaded.

Normally, the auxiliary transistors act as electronic switches and, owing to the strong driving action, to the provision of the resistors 19 and 20 and to a suitable choice of the resistor 13, only a very slight amount of power is dissipated in these transistors. The main transistors 3, 4 and 3', 4' also act as electronic switches, so that a substantially square voltage is produced across the winding 7 of the transformer. As a result, the converter arrangements shown in FIGS. 2 and 3 and the arrangement shown in FIG. 1 have comparatively small impedances. Hence the voltage variations as a function of the load current remain comparatively slight and only become considerable in the proximity of the maximum rated current of the transistors. This value of the current, at which the output voltage sharply decreases can be controlled as desired by means of the feedback winding 8, 8' or 8, 8' and 28, 28' and by the choice of the forward bias voltage.

The circuit arrangements described enable the resistor 9' connected in the base-emitter circuits of the main transistors to be made comparatively small, and this is particularly desirable in comparatively large voltage converters, for the control losses are thus reduced and the voltage control of the main transistors is improved, so that the switching losses in these transistors are reduced while keeping the storage effect at a minimum, as well as the effect of the spread in the transistor properties. Furthermore, a low value of this base resistor improves the thermal stability of the circuit arrangements and permits the use of higher cut-off voltages at the collector electrodes. In addition, the losses, the voltage peaks at the electrodes of the main transistors and the maximum output voltage in no-load condition are reduced, since a better recovery of the unused oscillation energy by feedback to the voltage supply 1 takes place via this small resistor and the collector-base diodes of the main transistors. The influence of the base resistor 9' on the load characteristic in the normal load range is small; however, it slightly reduces the maximum output power. Shunting it by a diode such as the diode 9 of FIG. 1 is always of advantage, but replacing the resistor 9' by such a diode is always highly disadvantageous, since this introduces a large impedance.

While particular embodiments of the invention have been illustrated and described, the invention is not limited thereto since various modifications may be made by a person skilled in the art without departing from the inventive concept, the scope of which is set forth in the appended claims. It is also noted that the quantitative values given for the circuit elements are only to enable ready practice of the invention, the inventive concept not being limited thereto.

What is claimed is:

1. A voltage converter comprising: an oscillator composed of at least one oscillator transistor having base, emitter and collector electrodes, a transformer having a primary winding and a two-part feedback winding, said primary winding being connected between said emitter and collector electrodes in series with a source of direct-current input voltage, one of said parts of said feedback winding being connected between said base electrode and one of said emitter and collector electrodes, an output circuit coupled to said oscillator, means connected between said base electrode and said source for supplying a forward bias current to said base electrode, said means including an auxiliary transistor having base, emitter and collector electrodes, the emitter electrode of the auxiliary transistor being connected to the base electrode of the oscillator transistor, the collector electrode of the auxiliary transistor being coupled to said source, the base electrode of said auxiliary transistor being connected to one end of the second of said parts of said feedback winding, the other end of said second part being coupled to one terminal of said source, the said two parts of said feedback winding having voltages induced therein such that the oscillation voltages across said one part are in phase opposition to those across said second part, the conductivity of said auxiliary transistor suddenly decreasing when the amplitude of the oscillator voltage across said second part of said feedback winding falls beneath a predetermined value thereby suddenly reducing said forward bias current when a load current flowing through said output circuit increases beyond a second predetermined value.

2. A converter as claimed in claim 1, further including means for momentarily supplying a forward current to the base electrode of the auxiliary transistor, said means including a capacitor and a manual switch connected in series between the base electrode of said auxiliary transistor and one terminal of said source, said auxiliary transistor being rendered momentarily conductive when said switch is turned on, said auxiliary transistor thereby supplying a forward bias current to the base electrode of said oscillator transistor.

3. A converter as claimed in claim 2, the base electrode of said auxiliary transistor being connected to the second part of said feedback winding through a first resistor, and a second resistor connected in series with said capacitor and said switch.

4. A converter as claimed in claim 3, further including a third resistor having a negative coefficient of temperature connected between the collector electrode of said auxiliary transistor and the emitter electrode of the oscillator transistor.

5. A converter as set forth in claim 4, said third resistor comprising the emitter-collector path of an additional transistor having base, emitter and collector electrodes, the base electrode of the additional transistor being open-circuited.

6. A voltage converter comprising: an oscillator composed of at least one pair of oscillator transistors each having base, emitter and collector electrodes, a tranformer having a center-tapped primary winding and a center-tapped feedback winding, each of the halves of said center-tapped primary winding being connected respectively between the emitter and collector electrodes of one of the transistors of said pair in series with a source of direct current input voltage having two terminals, and each of the halves of said center-tapped feedback winding being connected respectively between the base electrode of one of the transistors of said pair and one of the terminals of said source, an output circuit coupled to said oscillator, means connected between the base electrode of each of the transistors of said pair and said source for supplying a forward bias current to each of said base electrodes, said means including a pair of auxiliary transistors each having base, emitter and collector electrodes, the base and emitter electrodes of said auxiliary transistors being cross-connected to the base electrodes of the transistors of said pair of oscillator-transistors, the collector electrodes of the auxiliary transistors being connected to said source, the voltage across the halves of said primary winding being in phase opposition with respect to each other and the voltages across the halves of said feedback winding also being in phase opposition with respect to each other, the conductivity of said auxiliary transistors abruptly decreasing when the amplitude of the oscillator voltage across said feedback winding falls below a predetermined value, thereby abruptly reducing said forward bias current when a load current flowing through said output circuit increases beyond a second predetermined value.

7. A converter as claimed in claim 6, wherein the base electrode of one of the auxiliary transistors is connected to said feedback winding through a first resistor and to said source through a second resistor, a capacitor and a switch in series.

8. A converter as claimed in claim 7, further including a resistor having a negative coefficient of temperature connected between the collector electrodes of said auxiliary transistors and the emitter electrodes of said oscillator transistors.

9. A converter as claimed in claim 8, said resistor comprising the emitter-collector path of an additional transistor having base, emitter and collector electrodes, the base electrode of the additional transistor being open-circuited.

References Cited in the file of this patent

UNITED STATES PATENTS

| | | |
|---|---|---|
| 2,791,739 | Light | May 7, 1957 |
| 2,854,614 | Light | Sept. 30, 1958 |
| 2,941,158 | Pintell | June 14, 1960 |

OTHER REFERENCES

Transistor Power Supplies, by Light in Wireless World, pages 582–586, December 1955.